(No Model.) 2 Sheets—Sheet 1.

J. L. DIBBLE.
PIPE JOINT.

No. 261,141. Patented July 18, 1882.

Witnesses:
M. J. Leonard
W. W. Wigg

Inventor:
John L. Dibble
by Chas. M. Higgins
Attorney
New York

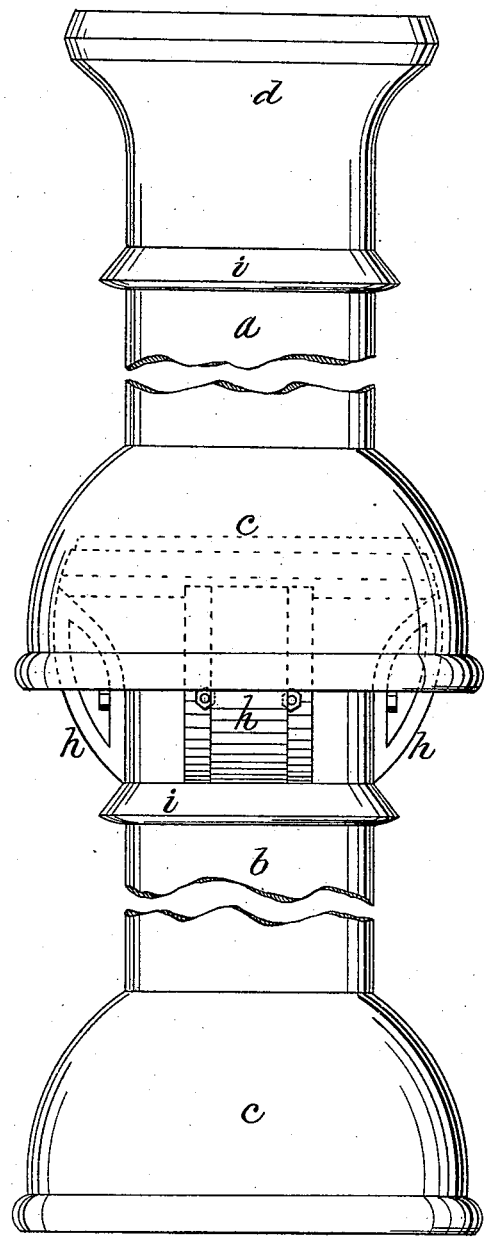

UNITED STATES PATENT OFFICE.

JOHN L. DIBBLE, OF BROOKLYN, NEW YORK.

PIPE-JOINT.

SPECIFICATION forming part of Letters Patent No. 261,141, dated July 18, 1882.

Application filed May 6, 1882. (No model.)

*To all whom it may concern:*

Be it known that I, JOHN L. DIBBLE, of Brooklyn, in the county of Kings and State of New York, have invented certain new and useful Improvements in Pipe-Joints, of which the following is a specification.

My invention applies to what is known as "ball-and-socket" or "universal" joints for water-mains or other fluid-conduits, adapted more especially for such mains as are laid under water, over bridges, or on marshy or yielding ground, where the joints require to be mobile, yet absolutely water-tight.

My improvements aim to provide a joint of this kind in which, first, the male part will be engaged with the female part in a simple and secure manner which will admit of ready engagement or disengagement when required, and, second, in which the packing will be so formed and applied that the necessity for turned or fitted surfaces in the castings may be dispensed with and the plain castings used directly, and which packing will at the same time maintain the joint tight against either internal or external pressure.

To these ends my invention embodies several novel features, as hereinafter fully set forth.

Figure 1:
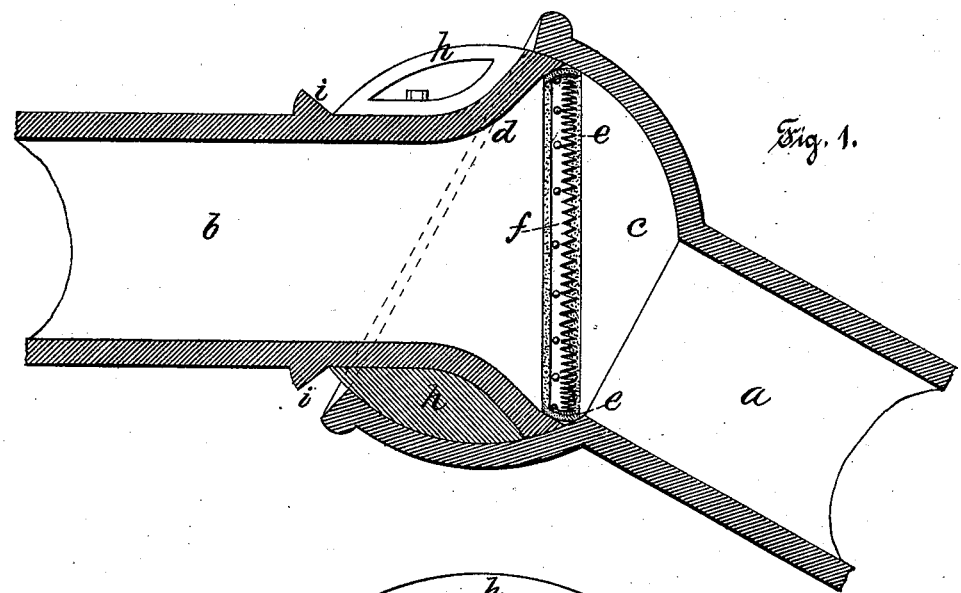
Figure 2:
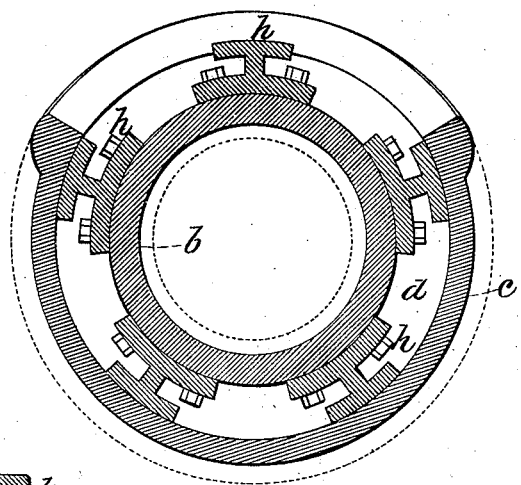
Figure 3:
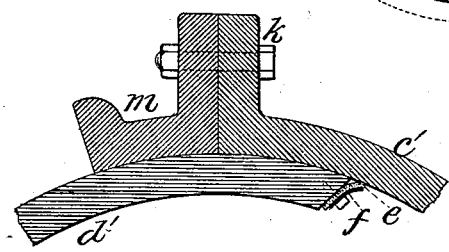
Figure 4:
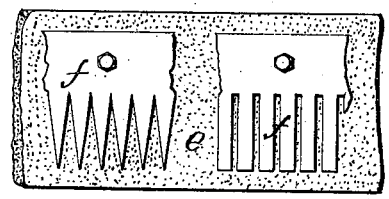

In the annexed drawings, Figure 1 presents a longitudinal section of my improved joint with the two members inclined to each other at nearly their utmost angle. Fig. 2 is a cross-section of the joint with the two members in line. Fig. 3 is an enlarged detail, showing a modification. Fig. 4 is a fragmentary view of the packing and its holder. Fig. 5 presents a plan view of the joint with both members in line.

In the drawings, $a$ $b$ indicate the two sections or lengths of the main or pipe which are joined at the meeting ends by my improved joint. The end of the section $a$ is formed with an enlarged mouth or socket, $c$, of spherical shape, as seen best in Figs. 1 and 4, which forms the female part of the joint, and it will be noted that the mouth of the socket opens beyond the diameter line of the sphere, so that the socket thus includes more than half the sphere. Now, the corresponding end of the section $b$, which forms the male part of the joint, is constructed with a trumpet or funnel shaped mouth, $d$, which is of such a size at the rim as to fit the interior of the spherical socket $c$, and its edge is beveled or rounded, as shown best in Fig. 1, to correspond with the concave surface of the socket, as will be understood. The fit of these parts, however, need not be exact, but should be free without any unnecessary play or looseness, and the meeting surfaces of the socket $c$ and the mouth $d$ need not be trued or turned off after casting, but may by my improvement be used as they come from the foundry with a smooth cast surface, thus saving a great deal of expense. Now, around the inner edge of the funnel $d$ is affixed a packing-ring or flap, $e$, which is preferably formed of leather, affixed at its inner edge by bolts or other fastenings to the rim of the funnel, while its opposite edge is left free and lies like a flap-valve against the concave surface of the socket $c$, so as to cover the junction of the funnel in the socket. This flap-ring, being flexible and free at its outer edge, will hence be forced tightly by internal pressure against the surface of the socket immediately around and in advance of the junction-line of the funnel with the socket, and will at the same time adapt itself to any slight irregularities of surface on the casting, and will thus form a perfectly water-tight joint, whether the joint be at rest or under slight flexion or torsion, as will be readily understood.

In order to hold the flap-ring in more firm position, and yet allow its free edge to yield to irregularities of surface, I prefer to overlay the same with a springy metal ring, $f$, which is fixed at its inner edge to the rim of the funnel by the same bolts which hold the leather flap $e$ thereto, but which is serrated or toothed at its free edge like a comb. The tooth or prongs of this comb-like ring extend out over the free portion of the flap, but do not extend quite to the free edge thereof, as shown best in Figs. 1 and 4. This comb-ring is curved in cross-section similar to the curve which the flap $e$ assumes when pressed to its seat, as seen in Fig. 1; but the toothed edge of the comb is so set or sprung as to have the strong and constant tendency of a spring to press the packing-flap firmly against the interior of the spherical socket $c$ at numerous independent points, thus constantly tending to hold it in place independently of the internal pressure in the main when filled. Hence, when the main is laid under water the joint will thus resist external pressure and prevent internal leakage at times when the pressure falls considerably within the main, thus keeping the joint tight without regard to the internal or external pressures. It will also be seen that as the springy teeth of the comb-strip $f$ are distributed at numerous points over the free portion of the flap the free edge of the flap is thus held elastically all around its edge and at a number of independent points, and is hence prevented from ruffling up or getting out of place at any point, no matter how much the joint be moved in a torsional or lateral direction; and, furthermore, the flap can readily bend or yield at any one point along its edge to ride over little roughnesses or irregularities on the cast surface of the socket $c$ without any danger of permitting leaks or becoming injured or displaced. The teeth of the comb may be made of tapering or rectangular shape, as shown in Fig. 4, or of other form; but the tapering shape is preferred.

The male part of the joint is engaged with the female part in a simple and novel manner, which is fully shown in Figs. 1, 2, and 5—that is, the mouth of the funnel $d$, which is of the same size as the mouth of the socket $c$, is inserted to its full extent into the socket and inclined at its utmost angle, as seen in Fig. 1. In this position one side of the funnel will be fully exposed outside the mouth of the socket, as seen at the top of Fig. 1. On this exposed part is affixed a "chuck" or segment, $h$, which is of I shape in cross-section, bolted at its base to the neck of the funnel, and having a spherical surface on its exterior to match the interior of the spherical socket $c$. When one spherical segment is thus affixed the funnel may be turned around in its socket without altering its inclination, thus bringing the affixed segment fully within the spherical socket, as shown at the bottom of Fig. 1. A second segment can then be affixed in the same way and turned into the socket, and when three or more are similarly affixed, as seen in Fig. 2, the funnel or male part of the joint will thus be firmly engaged with the socket or female part in a simple and positive manner, which will admit the easy motion of one part in the other whether in a lateral or torsional direction, but will not allow any longitudinal motion or displacement, thus producing an improved form of ball-and-socket joint. At the same time, when it is desired to detach the parts, it can be readily done by removing the segments in regular order, as will be readily understood. The outer or spherical surfaces of the spherical segments $h$ may or may not be turned off true; but turning is not necessary, and they may hence be used as cast, without any finish, for by reason of the self-adapting nature of the described packing a very accurate fit of the segments in the spherical socket $c$ is not essential, thereby rendering the construction of the joint inexpensive and at the same time very strong and tight.

The base of the segments $h$ may be concave to fit the convex exterior of the funnel $d$, as seen in Fig. 2; but I prefer to cast the funnel with flat places where the segments are to be affixed, and to form the segments with corresponding flat bases to fit thereon, as will be readily understood.

Instead of engaging the male and female parts of the joint in the preferred manner above described, they may be engaged as shown in Fig. 3. In this case the same form of packing and holding rings will be used as before; but the spherical socket will terminate on a central or diametrical plane, with a broad flat rim or shoulder, $k$, extending around the mouth, and the male part $b'$ $d'$ will be formed with a spherical end, including more than a hemisphere, to fit into the spherical socket and extend thereon beyond the diametrical plane thereof, as will be understood from Fig. 3. To the mouth-rim of the socket is bolted an equatorial spherical ring, $m$, which extends around the equatorial zone of the male sphere $d'$, and thus holds the same firmly in the socket, yet permits the angular or torsional movements of one part in the other, as will be understood. I do not, however, particularly recommend this mode of engagement, for in order to produce good effects the surface of the parts would require to be trued and fitted, which is not the case in the preferred and novel construction before described. If found practicable, however, the male and female parts of the joint may be cast together—that is, both parts may be formed spherical, one fitting into the other, the larger or female sphere being embedded in and forming part of the mold used in casting the inner or male sphere, or vice versa, according to the methods frequently employed in casting two movable engaging parts together, as founders will readily understand.

Instead of constructing the flap packing-ring $e$ of leather, it may be made of lead or other soft metal, or of rubber or other equivalent material; but leather is greatly preferred.

It may now be readily appreciated that the several described features of construction combine to produce a simple, inexpensive, and very efficient joint, which becomes of great practical use where pipes are suspended or laid over bridges or yielding foundations, and particularly in the case of subaqueous pipes. When the spherical socket is made of a diameter equal to one and a half time that of the pipe the joint will allow a lateral flexure of thirty degrees, or nearly so, and this may be increased by increasing the proportional diameter of the joint, and in all proportions the torsional movement will of course be unlimited.

Several slight modifications may of course be adopted without departing from the main features—for instance, ribs or stays may be cast on the outer surface of the socket $c$, or on the inner surface of the funnel *d*, to impart greater strength, if desired. In some cases the comb-like spring-ring *f* may be dispensed with; but in most cases its use is important.

Instead of forming the joint directly on the meeting ends of the pipe, as shown in Figs. 1 and 5, the two engaging parts of the joint may be formed separately from the sections of pipe, but with flanges on the ends to bolt the corresponding flanges on the ends of the sections of the pipe, as will be readily understood.

What I claim is—

1. An angular or torsional pipe-joint formed by the combination, with a spherical socket, *c*, including more than a hemisphere, of an inner tube or funnel, *d*, formed with a flaring mouth to fit the interior of the spherical socket within the diametrical line thereof, and a series of spherical segments, *h*, affixed to the tube or funnel around the flaring mouth, within the diametrical line, and engaging with the spherical socket, substantially as and for the purpose set forth.

2. The combination, with an angular or torsional pipe-joint, of the flexible packing-ring or yielding flap *e*, affixed near one edge around the rim of the inner or male part of the joint and left free at its outer edge, and arranged to overlie the junction of the male with the female or socket and rest against the surface of the socket in advance thereof, substantially as and for the purpose set forth.

3. The combination, in a yielding pipe-joint, of the packing-ring or flap *e*, affixed to the edge of the male and pressing at its free edge against the surface of the female, with the overlying toothed or comb-like spring-ring *f*, arranged and operating substantially as and for the purpose set forth.

JOHN L. DIBBLE.

Witnesses:
   CHAS. M. HIGGINS,
   M. J. LEONARD.